Aug. 29, 1950 A. F. LIEKENS 2,520,155
SWEEP CIRCUIT FOR CATHODE-RAY TUBES
Filed March 22, 1946
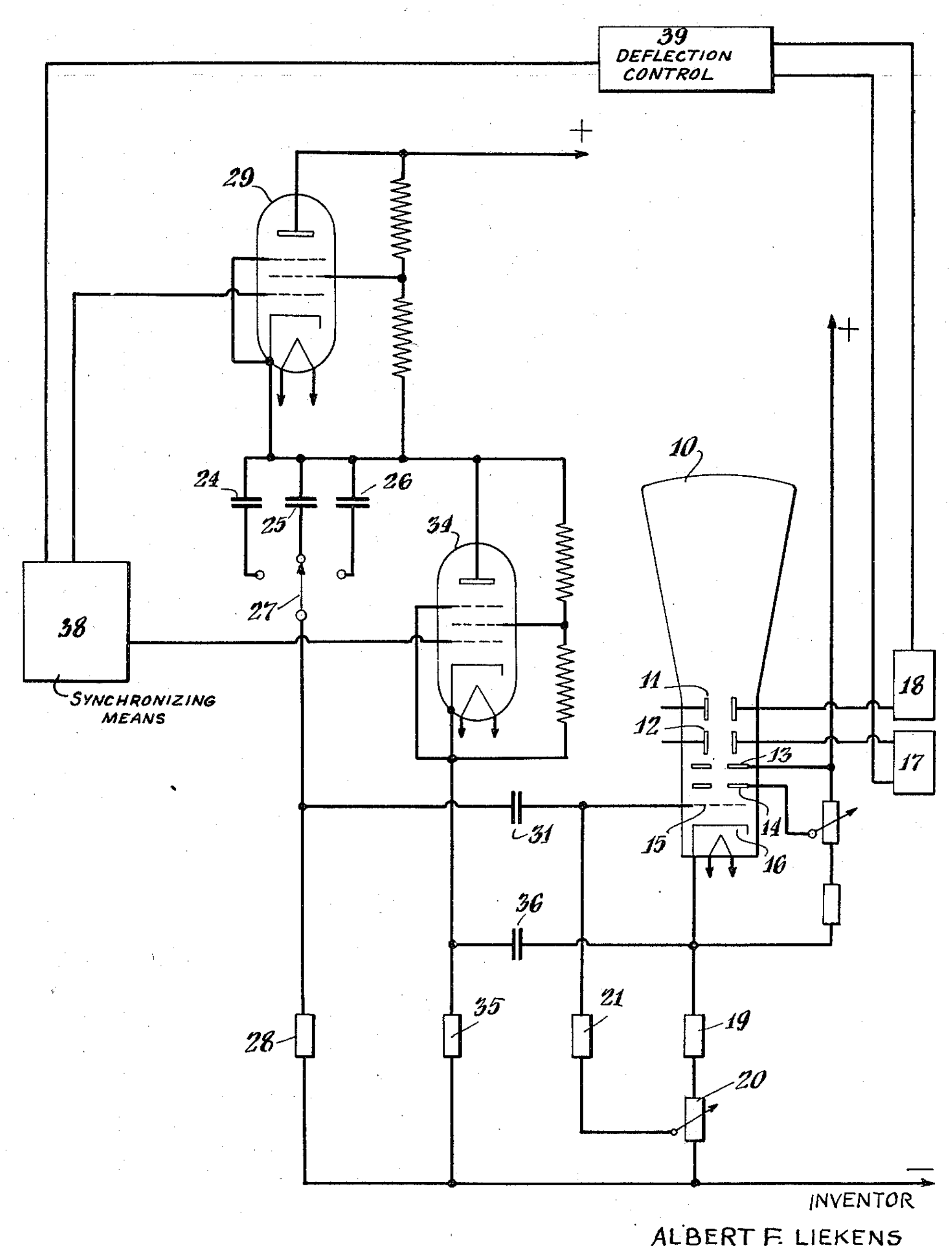
INVENTOR
ALBERT F. LIEKENS
BY
Robert Harding Jr
ATTORNEY

UNITED STATES PATENT OFFICE 2,520,155

SWEEP CIRCUIT FOR CATHODE-RAY TUBES

Albert F. Liekens, Keerbergen, Belgium, assignor to International Standard Electric Corporation, New York, N. Y., a corporation of Delaware Application March 22, 1946, Serial No. 656,225
In Belgium June 8, 1945

9 Claims. (Cl. 315—22)

The invention relates to a circuit including a cathode ray tube which will suppress the spot or beam trace upon the screen on the return sweep of the beam for a very broad frequency band. The circuit operates to change the relative bias of the control grid of the cathode ray tube. Suppression of the spot or return trace is obtained without the use of amplifiers or supplementary phase change devices which are ordinarily employed to accomplish this result and because these circuit elements are unnecessary with the circuit of the invention a very considerable broadening of the frequency band is effected. The circuit is particularly useful with an oscilloscope or like instrument.

It is an object of the invention to construct a circuit for use with cathode ray tubes which suppresses the return trace of the cathode ray beam without the use of amplifiers or phase changing devices.

Another object of the invention is to construct a new and novel circuit for a cathode ray tube which suppresses the spot or beam upon its return sweep.

Another object is to construct a circuit for a cathode ray tube in which the spot or trace of the beam upon the ray tube screen is controlled by the charging current of a condenser which develops a voltage which is applied to the control grid of the tube and suppression of the spot or trace is obtained by the discharging current of the condenser which develops a voltage which is applied to the cathode of the tube.

Other objects of the invention will be more apparent from the following description taken in connection with the accompanying drawings in which:

The figure is a diagrammatic view of a cathode ray tube and the circuit for controlling the spot or trace of the beam upon the screen.

The suppression of the spot or return trace of a cathode ray tube is obtained by uniformly charging a condenser with a constant current and controlling the potential upon the control grid of the cathode ray tube by the potential developed across a resistance in series with the condenser and hence carrying the charging current. Upon the return sweep of the beam, the trace or spot is suppressed by discharging the condenser through a resistance and the potential across its terminals is applied to the cathode of the cathode ray tube whereby the control grid of the cathode ray tube becomes sufficiently negative relative to the cathode so that the beam is extinguished.

The cathode ray tube 10 includes beam deflecting means such as the deflecting plates 11 and 12, anodes 13 and 14, a control grid 15 and a cathode 16. The beam deflecting means are connected with the customary sweep circuits 17 and 18 and proper potentials are applied to the anodes.

The cathode is connected to the negative side of a source of potential or ground through resistances 19 and 20 to provide bias for the control grid. The control grid is connected through a leak resistance 21 with the negative side of the source of supply or ground. Means may be provided to adjust the mean intensity of the beam, that illustrated including a variable resistor 20.

Means is provided to maintain the control grid of the cathode ray tube at the proper potential so that the beam will produce a trace upon the cathode ray tube screen. This means includes a condenser 24, 25 or 26, one of which may be connected into the circuit by a switch 27, a resistance 28 and a charging space discharge tube 29 connected in series. The space discharge tube is illustrated as a pentode although it is to be understood that any tube such as a vacuum tube, gas tube or any other type of relay which has a linear current characteristic may be used. The plate of the charging tube 29 is connected with a source of potential and the grids are connected in known fashion. The time constant of the circuit is selected so that the transmission will be correct for the sweep period.

The control grid 15 of the cathode ray tube is coupled to a high potential point upon the resistance 28 by a coupling condenser 31. As illustrated the coupling is at a point between resistance 28 and the switch or one of the charging condensers 24, 25 and 26. Since the current through the resistor is constant in a linear time base, the voltage at the terminals of the resistor 28 will be constant during the whole charge phase of the condenser and hence the luminosity of the spot or beam will remain constant during the charging phase or cycle.

Means is provided to discharge the condenser which includes a constant current discharge tube 34 which is illustrated as a pentode although this tube also may be any type of tube or relay. A resistance 35 is connected in series with the tube 34. The cathode 16 of the cathode ray tube is coupled to a high potential point upon the resistance 35 through a coupling condenser 36, the connection illustrated being at a point between the resistance and the discharge tube 34. The time constant of the discharge circuit is selected so that the transmission will be correct for the return sweep of the beam.

Any suitable synchronizing means 38 may be provided to maintain the charging of the condenser and its discharge in synchronism and phase with the sweep of the beam of the cathode ray tube. The connections between such a synchronizing means and the sweep circuits has been shown only by block diagram at 39, since numerous instances of such associating circuits are known in the art and are not in detail an essential part of this invention. In operation the condenser connected in the series with the discharge tube 29 is charged through the discharge tube with a constant current. This constant current through the resistance 28 establishes a constant voltage upon the terminals of the resistance during the whole charging phase which voltage is transmitted to the control grid of the cathode ray tube through the coupling condenser 31. The control grid is maintained relatively positive so that the beam leaves a clear and visible trace upon the screen of the tube. Upon the return sweep of the beam, the condenser is discharged through the discharge tube 34 and resistance 35 whereby a potential drop is produced at the terminals of the resistance which is transmitted to the cathode of the cathode ray tube through the coupling condenser 36. The cathode of the cathode ray tube has a positive potential applied thereto upon the return sweep of the beam which biases the control grid negatively with respect thereto and thereby suppresses the beam so that upon the return sweep the luminosity of the spot or trace is suppressed or reduced upon the screen of the tube. The synchronizing means controls the charging and discharging of the condenser so that the operation thereof is in phase or in synchronism with the sweep of the beam.

The invention is presented to fill a need for improvements in scanning circuits for cathode ray tubes. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A cathode ray tube circuit comprising a cathode ray tube having a cathode, control grid, and beam deflecting means, a condenser and a charging resistance connected in series and having a time constant related to the sweep period applied to the beam deflecting means of the cathode ray tube, control means synchronized with the beam deflecting means to charge the condenser, a discharge circuit for the condenser including a second resistance and having a time constant related to the return sweep of the beam of the cathode ray tube, and means coupling a high potential point on the latter resistance to the cathode of the cathode ray tube.

2. A cathode ray tube circuit comprising a cathode ray tube having a cathode, control grid, and beam deflecting means; a condenser and a charging resistance connected in series and having a time constant related to the sweep period applied to the beam deflecting means of the cathode ray tube, and control means synchronized with the beam deflecting means to charge the condenser, means for applying the voltage appearing across said resistance during the charging period to said control grid comprising means for transferring said voltage from a high potential point on the resistance to the control grid of the cathode ray tube during the charging period, and a discharge circuit for the condenser.

3. A cathode ray tube circuit comprising a cathode ray tube having a cathode, control grid and anode, a condenser and resistance in series, means to charge the condenser, means coupling a high potential point on the resistance to the control grid of the cathode ray tube during the charging period, a discharge circuit for the condenser including a resistance, and means coupling a high potential point on the latter resistance to the cathode of the cathode ray tube.

4. A cathode ray tube circuit comprising a cathode ray tube having a cathode and control grid, a condenser and resistance in series, means to charge the condenser, means coupling a high potential point on the resistance to the control grid of the cathode ray tube during the charging period, a discharge circuit for the condenser including a space discharge tube and a resistance connected in series therewith, and means coupling a high potential point on the latter resistance to the cathode of the cathode ray tube.

5. A cathode ray tube circuit comprising a cathode ray tube having a cathode and a control grid, a charging circuit including a space discharge tube, a condenser and resistance connected in series, means coupling a high potential point on the resistance to the control grid of the cathode ray tube during the charging period, a discharge circuit for the condenser including a resistance, and means coupling a high potential point on the latter resistance to the cathode of the cathode ray tube.

6. A cathode ray tube circuit comprising a cathode ray tube having a cathode and control grid, a charging circuit including a space discharge tube, a condenser and resistance connected in series, means coupling a high potential point on the resistance to the control grid of the cathode ray tube during the charging period, a discharge circuit connected with the condenser including a space discharge tube and a resistance connected in series, and means coupling a high potential point on the latter resistance to the cathode of the cathode ray tube.

7. A cathode ray tube circuit comprising a cathode ray tube having a cathode, and control grid, a condenser and resistance connected in series, and having a time constant related to the sweep period applied to the cathode ray tube, means to charge the condenser, means coupling a high potential point on the resistance to the control grid of the cathode ray tube during the charging period, a discharge circuit for the condenser having a time constant related to the return sweep of the cathode ray tube, including a resistance, and means coupling a high potential point on the latter resistance to the cathode of the cathode ray tube.

8. A cathode ray tube circuit comprising a cathode ray tube having a cathode, control grid, and means to sweep the beam across the cathode ray tube and return; a charging circuit including a discharge tube, a condenser and resistance connected in series and having a time constant related to the sweep period applied to the cathode ray tube; means coupling a high potential point on the resistance to the control grid of the cathode ray tube during the charging period, a discharge circuit for the condenser having a time constant related to the return sweep of the cathode ray tube including a discharge tube and a resistance connected in series; and means coupling a high potential point on the latter resistance to the cathode of the cathode ray tube.

9. A cathode ray tube circuit comprising a cathode ray tube having a cathode, control grid, and means to sweep the beam across the cathode ray tube and return; a charging circuit including a discharge tube having a constant current characteristic, a condenser and resistance connected in series, the condenser and resistance having a time constant related to the sweep period applied to the beam of the cathode ray tube; a condenser coupling a high potential point on the resistance to the control grid of the cathode ray tube; a discharge circuit for the condenser having a time constant related to the return sweep of the cathode ray tube including a discharge tube having a constant current characteristic and a resistance connected in series; and a condenser coupling a high potential point on the latter resistance to the cathode of the cathode ray tube.

ALBERT F. LIEKENS.

REFERENCES CITED

The following references are of record in the file of this patent:

UNITED STATES PATENTS

| Number | Name | Date |
|---|---|---|
| 2,137,262 | Bowman-Manifold | Nov. 22, 1938 |
| 2,222,943 | George | Nov. 26, 1940 |
| 2,261,776 | Poch | Nov. 4, 1941 |
| 2,285,043 | Messner | June 2, 1942 |
| 2,296,050 | Poch | Sept. 15, 1942 |
| 2,303,924 | Faudell | Dec. 1, 1942 |
| 2,415,870 | De Ryder | Feb. 18, 1947 |